(No Model.)
R. W. HENT.
ROLLER BEARING.
No. 394,269. Patented Dec. 11, 1888.
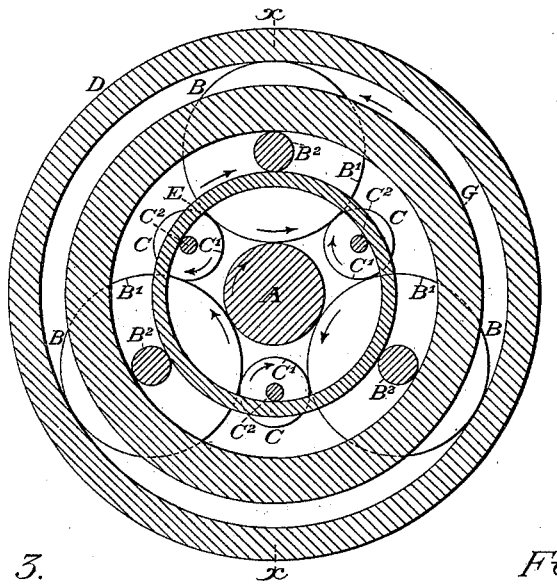
Fig. 1.
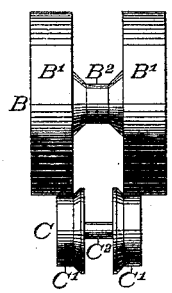
Fig. 5.
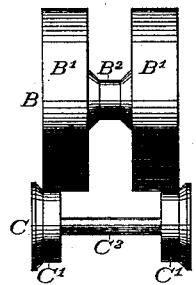
Fig. 6.
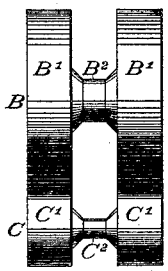
Fig. 3.
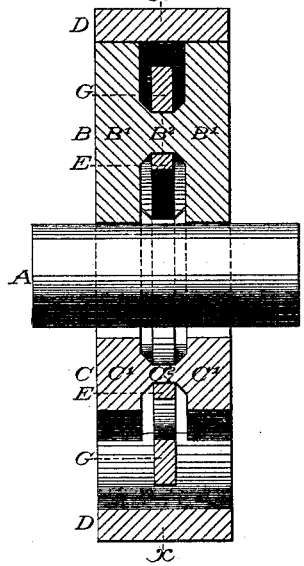
Fig. 2.
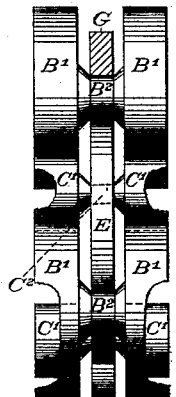
Fig. 4.
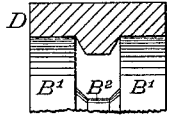
Fig. 7.
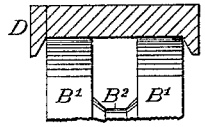
Fig. 8.
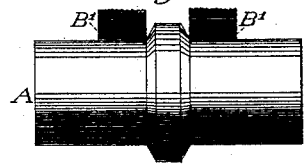
Fig. 9.
Fig. 10.
Witnesses:
Inventor:

UNITED STATES PATENT OFFICE.

REUBEN W. HENT, OF SAN FRANCISCO, CALIFORNIA.

ROLLER-BEARING.

SPECIFICATION forming part of Letters Patent No. 394,269, dated December 11, 1888.

Original application filed April 16, 1887, Serial No. 235,040. Divided and this application filed February 27, 1888. Serial No. 265,434. (No model.)

*To all whom it may concern:*

Be it known that I, REUBEN W. HENT, a citizen of the United States, residing in the city and county of San Francisco, and State of California, have invented a certain new and useful Improvement in Roller-Bearings, of which the following is a specification.

My invention is an improvement on my roller-bearing shown and described in my application for patent filed April 16, 1887, Serial No. 235,040, in which a ring bears at its periphery on journals of a series of bearing-rollers bearing directly on the shaft and casing and at its inner side on journals of a series of separating-rollers bearing neither on the shaft nor casing, but on the bearing-rollers, keeping the latter separate from each other, and by such bearing kept from contact with the shaft. In said roller-bearing, after a little wear of the casing and bearing-rollers, said journals of the bearing-rollers are liable to shift from the ring.

The object of my improvement is to prevent said shifting. This object is attained by the addition of a larger ring bearing at its inner side on journals of the bearing-rollers. In such additional ring and the peculiar construction and combinations of the parts hereinafter set forth consists essentially my improvement. It is illustrated in the accompanying drawings, in which—

Figure 1 is a transverse section through the center or on the line $x\,x$, Fig. 2, of a roller-bearing embodying my improvement. Fig. 2 is a longitudinal section through the center or on the line $x\,x$, Fig. 1. Fig. 3 is a side view of a bearing-roller and a separating-roller, showing the relative positions of the rollers as seen along the plane tangent to both. Fig. 4 is a side view of said roller-bearing as it appears after the removal of the shaft and casing, portions of the rollers being broken away and said larger ring being shown in section. Figs. 5, 6, 7, 8, and 9 are views showing means of retaining the several parts in their proper longitudinal positions, Figs. 5 and 6 also showing separating-rollers reduced in weight. Fig. 10 is a side view of a short separating-roller.

A represents the shaft; B, the bearing-rollers as wholes; C, the separating-rollers as wholes; D, the casing, and E and G the rings.

The rings are hollow cylinders, coaxial with the shaft and with each other and of different diameters, the ring G being the larger.

Each bearing-roller B consists of two journals, B', bearing directly on the shaft and casing, and of a smaller journal, $B^2$, located between and coaxial with the journals B' and rotating between and in contact with the periphery of the ring E and the inner side of the ring G.

The separating-rollers C, keeping the rollers B separate from each other, and by their bearing on the latter kept from contact with the shaft, consist each of two journals, C', bearing only on the journals B', each journal C' on and between two journals B', and of a smaller journal, $C^2$, located between and coaxial with the journals C', and rotating in contact with the inner side of the ring E. The ring E is interposed between and bears on the journals $B^2$ at its periphery and the journals $C^2$ at its inner side.

The larger ring, G, bears at its inner side on the journals $B^2$, and, forming rolling bearings for these journals, keeps the latter in contact with the ring E independently of any bearing of the journals B' on the casing, thus preserving the circularity and diameter of the orbit of the rollers B and its concentricity with the ring E whatever the wear of the journals B' and the casing. The arrow-heads indicate the relative directions, when the casing is stationary, of the axial rotations of the shaft and rollers and of the rings caused by the axial rotations of the journals $B^2$ and $C^2$.

The ring G is rotated by the journals $B^2$ without sliding friction, receives none of the pressure of the load, and is required only to resist the outward pressure of the journals $B^2$, which cannot exceed the weight and centrifugal force of the rollers B.

The ring G receives no pressure of the journals $B^2$ while the rollers B are under the pressure of the load—that is, during two-thirds of their travel in their orbit, when only three rollers B are employed.

If the velocity of the rollers B in their orbit is considerable, the journals B' are preferably hollowed to the extent permitted by their required strength, thereby reducing said weight and centrifugal force. These may be still further reduced by hollowing the journals $B^2$ also. If said velocity is great, preferably, also, the ring G is given a bearing on journals of the rollers B other than the journals B², thereby relieving the latter of all pressure upon the ring, and preferably, also, said journals on which the ring bears are made of the smallest diameter consistent with their needed strength, thereby diminishing the speed of the rotation of the ring caused by the axial rotations of these journals. If said velocity is very great, preferably, also, the ring and journals are lengthened, or several rings G and sets of journals are employed, thereby still further lessening their liability to wear. It follows that if said weight and centrifugal force are reduced, and the ill effects of what necessarily remains of them are avoided to the extent permissible, as recommended, the ring or rings G and the journals rotating in contact therewith will incur no substantial wear and retain substantially their original dimensions whatever the wear of the other parts.

The ring G, unless bearing on other journals than the journals B², is preferably of the same length as the ring E.

The journals C' may be much shorter than the journals B', as shown in Figs. 5, 6, and 10.

When the rollers C are retained in their proper longitudinal positions by the ring E, as shown in Figs. 2 and 3, the inner ends of both journals B' and C' are preferably beveled to avoid sliding friction. If they are not so retained and the journals C² are a little longer than the journals B² or the rings, as shown in Figs. 5 and 6, then sliding friction may be avoided by beveling the inner ends of the journals B' only.

All the journals B' and C' may be formed separate from and securely and rigidly attached to the journals B² and C², or all or any of them (except of course the few necessarily removable to permit the insertion between the shaft and casing of the rollers and rings in their proper relative positions) may be formed integral with the journals B² and C², respectively.

It is evident that instead of a single ring, G bearing on the journals B², two rings G may bear on journals of the rollers B, located at the outer ends of the journals B', and that if journals C² and B² are located at the outer ends of the journals C' and B' instead of two rings G bearing on such journals B² a single ring G may bear on journals of the rollers B, located between the inner ends of the journals B'. Therefore I do not intend to limit my claims to one ring G, nor to any particular number of rings G, nor to any particular location longitudinally on the rollers B of the rings G and the journals on which they bear, nor to journals of the rollers B, rotating in contact with both the rings E and G.

I claim as my invention—

1. In a roller-bearing, the combination, with a series of bearing-rollers bearing directly on the shaft and casing, a series of separating-rollers bearing neither on the shaft nor casing, but on the bearing-rollers, and a ring bearing at its periphery on journals of the bearing-rollers and at its inner side on journals of the separating-rollers, of a larger ring bearing at its inner side on journals of the bearing-rollers, substantially as set forth.

2. In a roller-bearing, the combination, with the series of bearing-rollers B, consisting each of two journals, B', bearing directly on the shaft A and casing D, and a journal, B², the series of separating-rollers C, consisting each of two journals, C', bearing only on the journals B', and a journal, C², and the ring E, bearing at its periphery on the journals B² and at its inner side on the journals C², of the ring G, adapted to bear at its inner side on the journals B², substantially as shown and described, and for the purposes set forth.

3. In a roller-bearing, the combination of a series of bearing-rollers bearing directly on the shaft and casing and having journals adapted to rotate in contact with the periphery of a ring coaxial with the shaft and in contact with the inner side of a larger ring also coaxial with the shaft, and a series of separating-rollers bearing neither on the shaft nor casing, but on the bearing-rollers, and having journals adapted to rotate in contact with the inner side of said first-mentioned ring, all constructed and arranged substantially as set forth.

4. In a roller-bearing, the combination of the series of bearing-rollers B, consisting each of two journals, B', bearing directly on the shaft A, and casing D, and a journal, B², adapted to rotate between and in contact with the periphery of the ring E and the inner side of the ring G, and the series of separating-rollers C, consisting each of two journals, C', bearing only on the journals B', and a journal, C², adapted to rotate in contact with the inner side of said ring E, all constructed and arranged substantially as shown and described, and for the purposes set forth.

5. In a roller-bearing, the combination, with two rings coaxial with the shaft and of different diameters, of a series of bearing-rollers bearing directly on the shaft and casing and having journals adapted to rotate in contact with the periphery of the smaller of said rings and in contact with the inner side of the larger of said rings, and a series of separating-rollers bearing neither on the shaft nor casing, but on the bearing-rollers, and keeping the latter separate from each other, and having journals adapted to rotate in contact with the inner side of said smaller ring, all constructed and arranged substantially as and for the purposes set forth.

6. In a roller-bearing, the combination, with the rings E and G, coaxial with the shaft A, of the series of bearing-rollers B, consisting each of two journals, B', bearing directly on the shaft and casing, and a journal, B², located between the journals B' and adapted to rotate between and in contact with the periphery of the ring E and the inner side of the ring G, and the series of separating-rollers C, keeping the rollers B separate from each other, and consisting each of two journals, C', bearing only on the journals B', each journal C' on and between two journals, B', and a journal, C², located between the journals C' and adapted to rotate in contact with the inner side of the ring E, all constructed and arranged substantially as shown and described, and for the purposes set forth.

7. In a roller-bearing, the combination, within the casing, of the shaft, two rings coaxial with the shaft and of different diameters, a series of bearing-rollers bearing directly on the shaft and casing and having journals adapted to rotate in contact with the periphery of the smaller of said rings and in contact with the inner side of the larger of said rings, and a series of separating-rollers bearing neither on the shaft nor casing, but on the bearing-rollers, and keeping the latter separate from each other and by such bearing kept from contact with the shaft, and having journals adapted to rotate in contact with the inner side of said smaller ring, all constructed, arranged, and operating substantially as and for the purposes set forth.

8. In a roller-bearing, the combination, within the casing D, of the shaft A, the series of bearing-rollers B, consisting each of two journals, B', bearing directly on the shaft and casing, and of a journal, B², located between the journals B' and adapted to rotate between and in contact with the periphery of the ring E and the inner side of the ring G, the series of separating-rollers C, keeping the rollers B separate from each other and by their bearing on the latter kept from contact with the shaft, and consisting each of two journals, C', bearing only on the journals B', each journal C' on and between two journals B', and a journal, C², located between the journals C' and adapted to rotate in contact with the inner side of said ring E, the said ring E adapted to bear at its periphery on the journals B² and at its inner side on the journals C², and the said ring G adapted to bear at its inner side on the journals B², all constructed, arranged, and operating substantially as shown and described, and for the purposes set forth.

9. A roller-bearing comprising the shaft A, the casing D, the series of bearing-rollers B, consisting each of two journals, B', bearing directly on the shaft and casing, and a journal, B², located between the journals B' and rotating between and in contact with the periphery of the ring E and the inner side of the ring G, the series of separating-rollers C, consisting each of two journals, C', bearing only on the journals B', each journal C' on and between two journals B', and a journal, C², located between the journals C' and rotating in contact with the inner side of said ring E, the said ring E bearing at its periphery on the journals B² and at its inner side on the journals C², and the said ring G bearing at its inner side on the journals B², all constructed, arranged, combined, and adapted to operate substantially as shown and described, and for the purposes set forth.

REUBEN W. HENT.

Witnesses:
 WALTER G. HOLMES,
 WALTER B. BLAIR.